(12) United States Patent
Asuncion

(10) Patent No.: US 11,706,563 B2
(45) Date of Patent: Jul. 18, 2023

(54) SUBMERSIBLE SPEAKER SYSTEM WITH A COMPRESSIBLE SPACER

(71) Applicant: GoPro, Inc., San Mateo, CA (US)

(72) Inventor: Bryan C. Asuncion, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 437 days.

(21) Appl. No.: 15/368,557

(22) Filed: Dec. 2, 2016

(65) Prior Publication Data
US 2018/0084339 A1    Mar. 22, 2018

Related U.S. Application Data

(60) Provisional application No. 62/395,937, filed on Sep. 16, 2016.

(51) Int. Cl.
*H04R 1/44* (2006.01)
*H04R 1/02* (2006.01)
*H04N 23/51* (2023.01)

(52) U.S. Cl.
CPC ............... *H04R 1/44* (2013.01); *H04N 23/51* (2023.01); *H04R 1/023* (2013.01); *H04R 1/028* (2013.01); *H04R 2499/11* (2013.01)

(58) Field of Classification Search
CPC .................. H04R 1/44; G03B 17/08
See application file for complete search history.

(56) References Cited

U.S. PATENT DOCUMENTS

2005/0179813 A1* 8/2005 Fujii .................... H04N 23/51
348/E5.026

* cited by examiner

*Primary Examiner* — Y Lee
(74) *Attorney, Agent, or Firm* — Young Basile Hanlon & MacFarlane, P.C.

(57) ABSTRACT

A camera system includes an internal loudspeaker assembly for emitting sound waves from the interior of the camera body to the exterior of the camera body through external ports using internal electronic components. Some components of the loudspeaker assembly are sensitive to wet conditions and are protected from the environment by a membrane. The membrane and its support structures are configured to allow the sound waves to translate through the membrane and external to the camera body in both wet and dry environments. The loudspeaker assembly includes a support structure that prevents the membrane from deforming to the point of breaking or to the point of contacting the loudspeaker when submerged.

15 Claims, 6 Drawing Sheets

Legend:
210: Loudspeaker Housing
234: Loudspeaker Membrane Cap
236: First Loudspeaker Cavity
240: Loudspeaker Membrane
252: Support Structure
260: Second Loudspeaker Cavity
262: Third Loudspeaker Cavity Legend:
210: Loudspeaker Housing
210a: Housing Sidewall
210b: Housing Lip
210c: Housing Platform
220: Loudspeaker PCB
230: Speaker Grille
230a: Grille Plate
230b: Grille Ports
230c: Grille Extensions
250: Loudspeaker
234: Loudspeaker Membrane Cap
240: Loudspeaker Membrane
252: Support Structure
252a: Support Plate
252b: Support Structure Ports
252c: Support Extensions

SUBMERSIBLE SPEAKER SYSTEM WITH A COMPRESSIBLE SPACER

RELATED APPLICATIONS

This application claims priority to U.S. Provisional Application No. 62/395,937 filed Sep. 16, 2016, which is incorporated in its entirety by this reference.

TECHNICAL FIELD

This disclosure generally relates to a camera system, and more specifically to a submersible audio system of a camera system.

BACKGROUND

Digital cameras are becoming faster, more powerful, and cheaper to produce. As the technology behind cameras has improved, a sub-set of miniaturized high quality 'action cameras' used in non-traditional camera environments has been developed. When a traditional action camera is used in harsh environments where moisture is prevalent, the cameras are typically encapsulated in a waterproof housing designed to protect the camera system and its sensitive components from the external environment. While these housings still allow for manipulation of the camera and its configuration settings without compromising image and video quality, the housings remain undesirably large, cumbersome to affix to the camera system, and a detriment to the user experience of the action camera system.

DETAILED DESCRIPTION

Figure 1A:
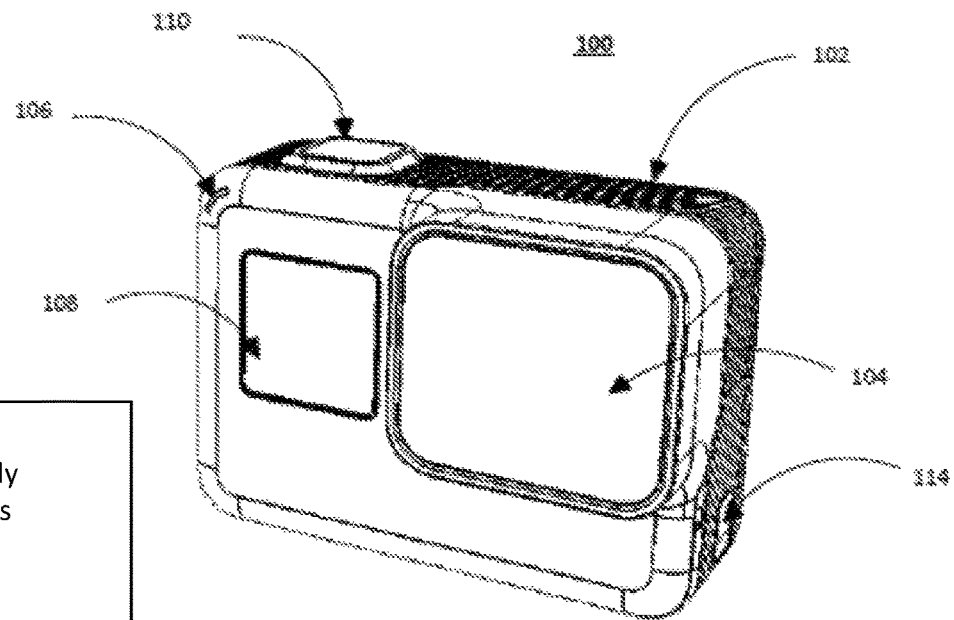
FIG. 1A is a first isometric view of a submersible camera system, according to one embodiment.
Figure 1B:
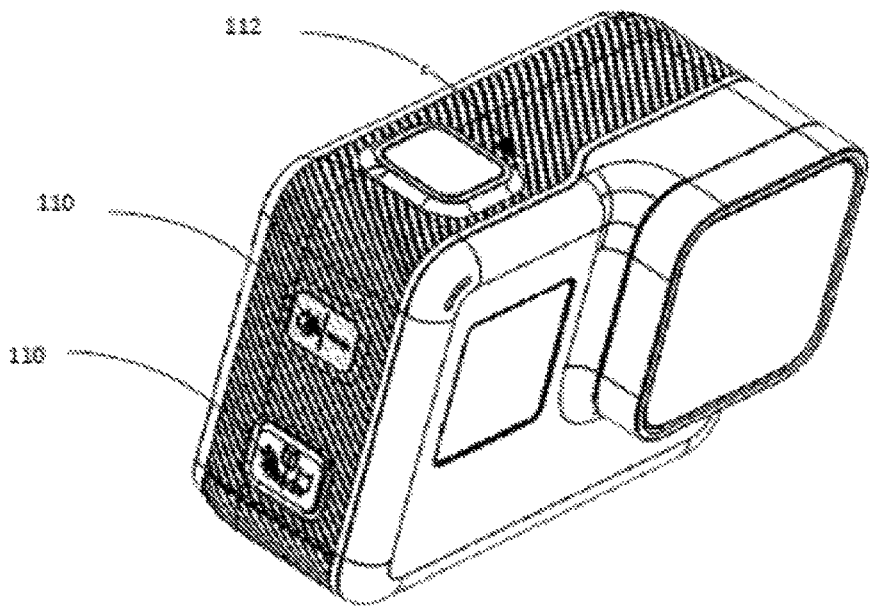
FIG. 1B is a second isometric view of a submersible camera system, according to one embodiment.
Figure 1C:
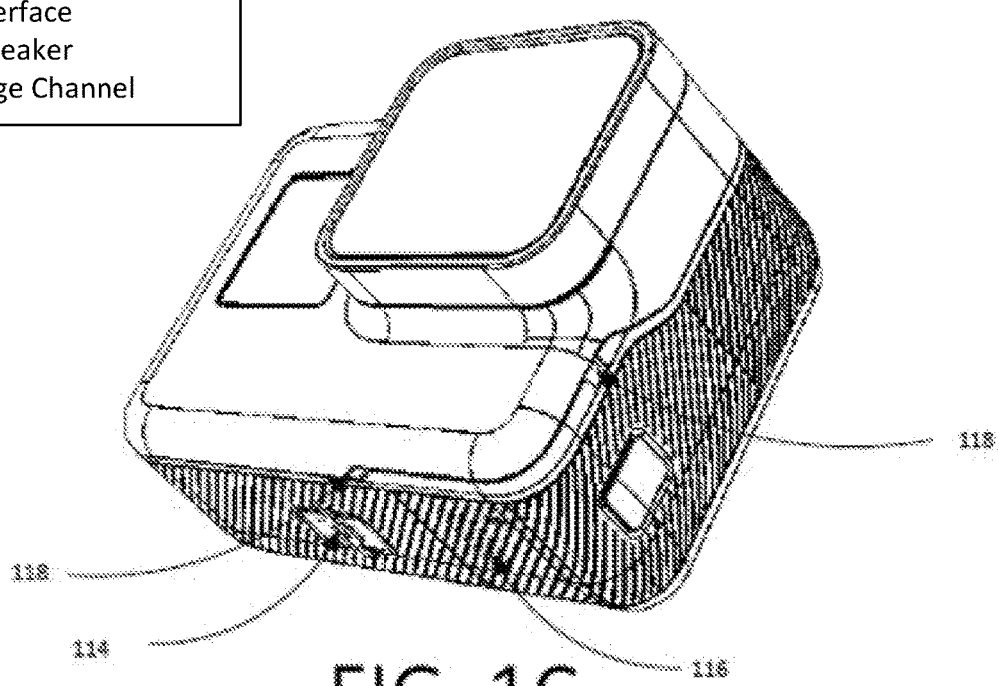
FIG. 1C is a third isometric view of a submersible camera system, according to one embodiment.
Figure 1D:
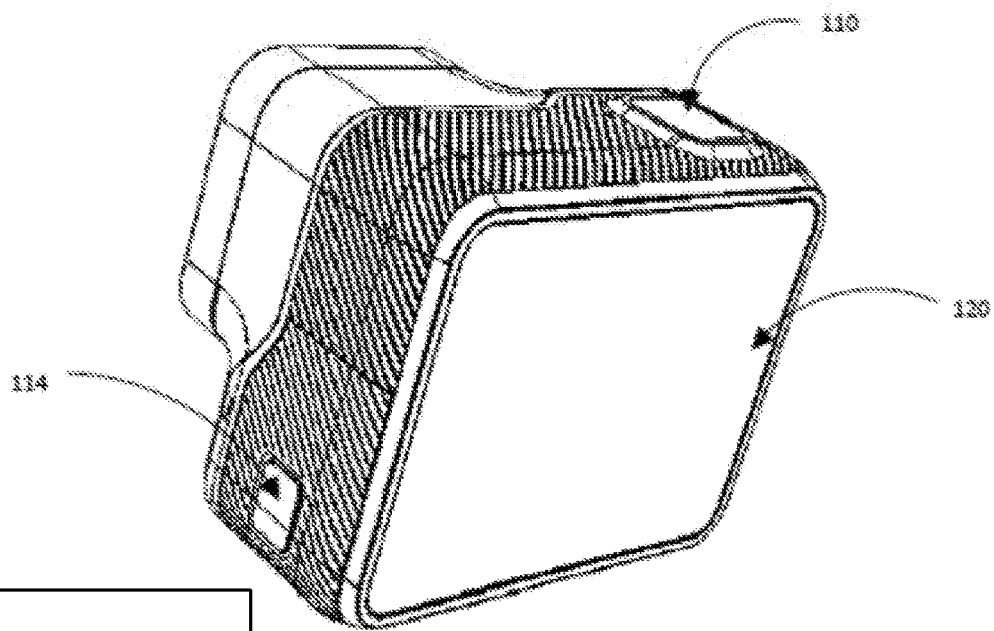
FIG. 1D is a fourth isometric view of a submersible camera system, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A digital camera may have a camera body. The camera body may a camera lens structured on a front surface of the camera body. Internal to the camera body, an image sensor and electronics (e.g., imaging electronics, loudspeaker electronics, etc.) is configured to capture images via the camera lens and/or performing other functions. The loudspeaker electronics may include an audio circuit board configured to process an audio signal into an electrical signal. The loudspeaker may be further configured convert electrical signals into sound waves for projection external the camera body. In some embodiments the loudspeaker electronics are coupled to other components internal to the camera body via a compressible spacer.

The loudspeaker internal to the camera body may include a loudspeaker grille with an array of grille ports configured to allow passage of sound waves from inside the camera body to outside the camera body during audio playback. The loudspeaker may be separated from the external environment by a waterproof membrane internal the camera body. The loudspeaker membrane may be configured to prevent moisture from passing from outside the camera body to inside the camera body while allowing transmission of sound waves through the membrane and to deform when a pressure differential exists on opposing sides of the membrane. The loudspeaker membrane may be separated from the loudspeaker by a loudspeaker support structure. The loudspeaker support structure is configured to limit the amount of deformation of the waterproof membrane and allow transmission of sound waves from the loudspeaker to the waterproof membrane and external the camera body.

The components of the loudspeaker may be mechanically coupled by a loudspeaker housing configured to create a first loudspeaker cavity between the loudspeaker grill and the waterproof membrane, a second loudspeaker cavity between the waterproof membrane and the support structure, and a third loudspeaker cavity between the support structure and the loudspeaker.

The loudspeaker may be configured to playback audio signals when the camera system is partially wet or submerged in a wet environment. Further, the loudspeaker membrane may be configured to deform without being compromised when the loudspeaker membrane is partially wet or completely submerged.

Example Camera Configuration

FIGS. 1A-1D illustrate an embodiment of an example camera 100 that may include an audio system for use in a submersible camera system. The camera 100 may comprise a camera body 102 having a camera lens 104 structured on a front surface of the camera body, various indicators on the front of the surface of the camera body 102 (such as LEDs, displays, and the like), various input mechanisms (such as buttons, switches, and touch-screen mechanisms), and electronics (e.g., imaging electronics, power electronics, etc.) internal to the camera body 102 for capturing images via the camera lens and/or performing other functions. The camera 100 may be configured to capture images and video, and to store captured images and video for subsequent display or playback.

The camera 100 can include various indicators, including the LED lights 106 and the LED display 108. The camera 100 can also include buttons 110 configured to allow a user of the camera to interact with the camera, to turn the camera on, and to otherwise configure the operating mode of the camera. The camera 100 can also include a microphone 112 configured to receive and record audio signals in conjunction with recording video. The side of the camera 100 may include an I/O interface 114. The camera may also include a loudspeaker 116 system integrated into the camera housing. The front surface of the camera may include two drainage ports as part of a drainage channel 118 for the camera audio system that operate to drain liquid away from microphones located near the drainage channel 118. The camera can include an interactive display 120 that provides a user interface to allow a user to interact with the camera and may additionally display camera information (such as menus or image previews) on a surface of the camera. As illustrated, the camera 100 may include a lens 104 configured to receive light incident upon the lens and to direct received light onto an image sensor internal to the lens.

The camera 100, includes a camera exterior that encompasses and protects the camera's internal electronics, which are further described in later sections. The camera exterior may include 6 surfaces (i.e. a front face, a left face, a right face, a back face, a top face, and a bottom face), wherein the exterior surfaces form a substantially rectangular or quasi-rectangular structure. Furthermore, both the front and rear surfaces of the camera 100 are substantially rectangular in shape. The camera 100 can be made of a rigid material such as plastic, aluminum, steel, or fiberglass. Additional camera features, such as the features described below, may be affixed to an exterior or interior of the camera. In some embodiments, the camera 100 described herein includes features other than those described below. For example, instead of a single interface button, the camera 100 can include additional buttons or different interface features, such as a multiple microphone openings to receive voice or other audio commands.

Integrated Loudspeaker Assembly

An integrated loudspeaker assembly for use in a submersible system camera may comprise a loudspeaker system internal to the camera body and separated from external environments by a waterproof membrane configured to protect the electronic components internal to the camera body while still allowing translation of vibrational sound waves through the loudspeaker membrane. The integrated loudspeaker system may be internal to the camera body with the loudspeaker configured to project sound towards an external surface of the camera body through the loudspeaker membrane.

Figure 2A:
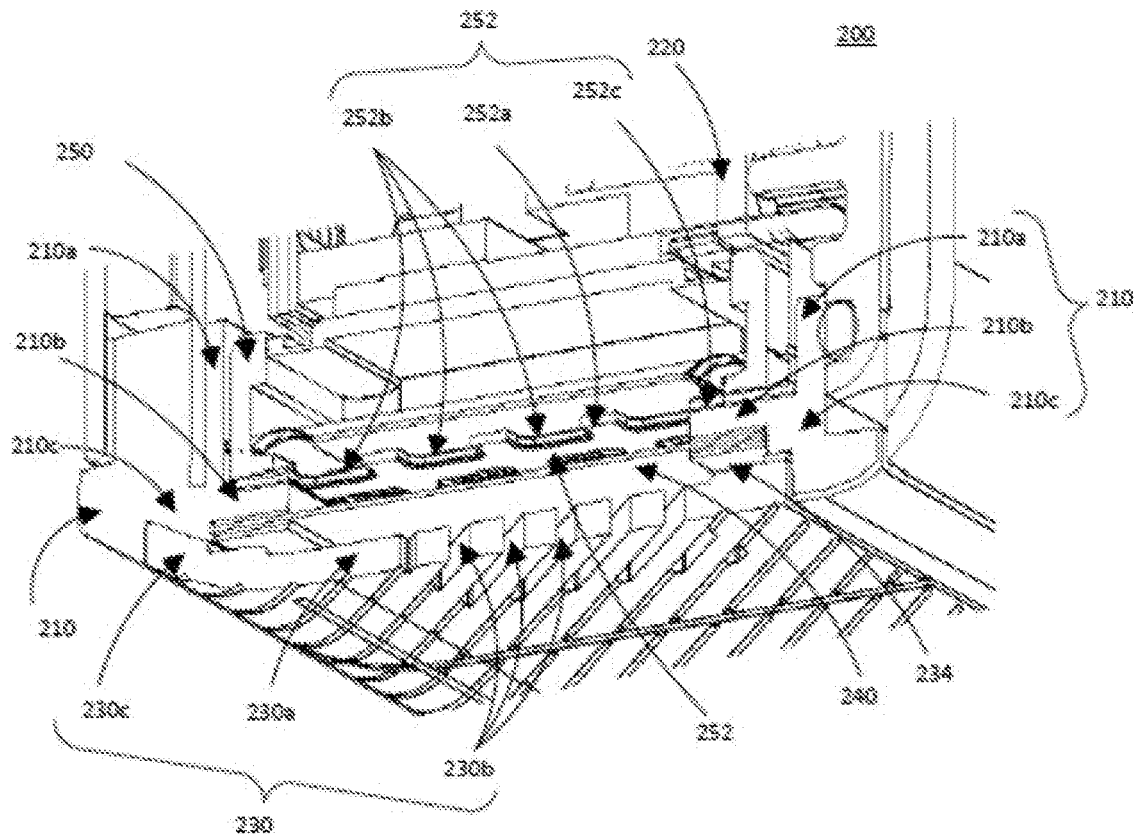
FIG. 2A is a first isometric cross-sectional view of a speaker system in a submersible camera system, according to one embodiment.
Figure 2B:
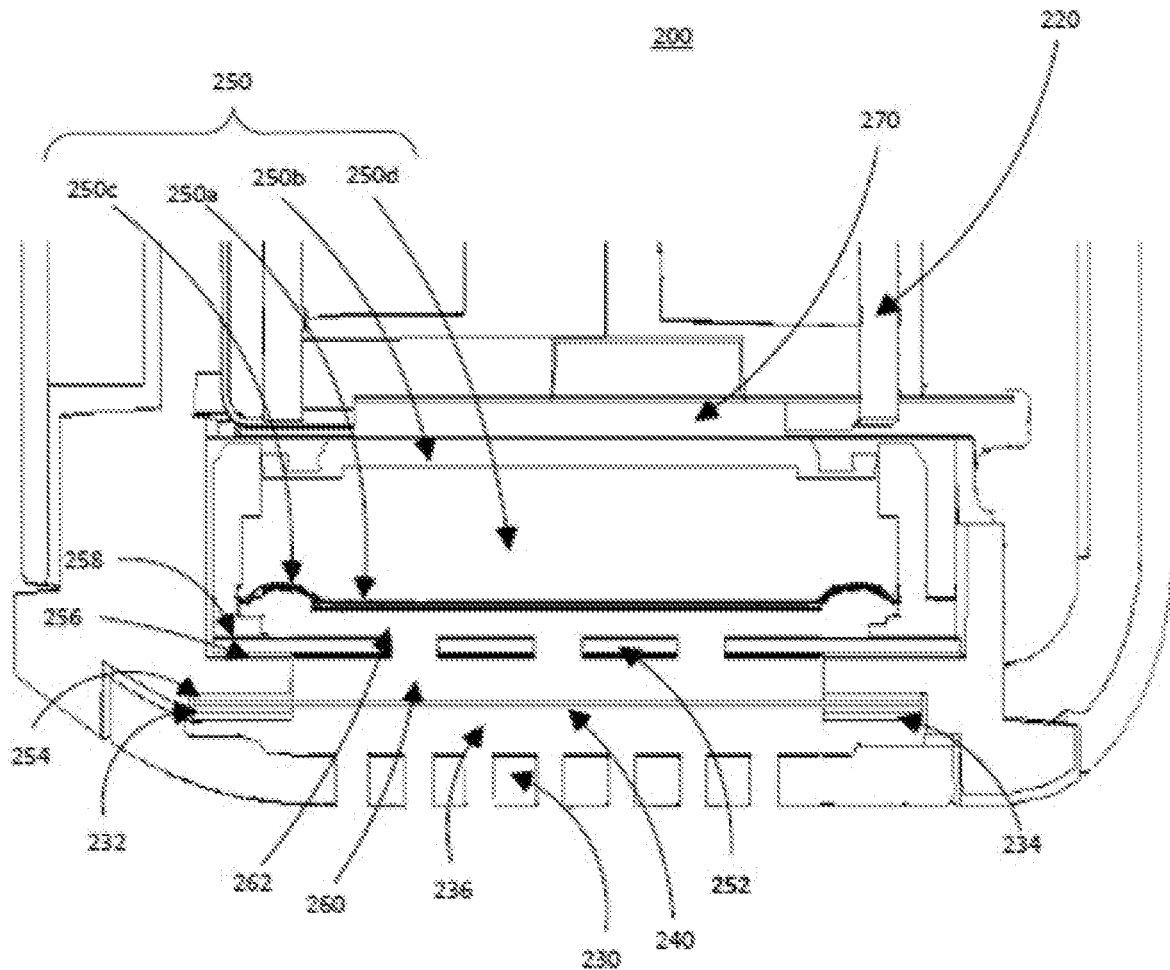
FIG. 2B is a second cross-sectional view of a speaker system in a submersible camera system, according to one embodiment.

FIGS. 2A and 2B illustrate different cross-sectional views of an embodiment of an integrated speaker assembly 200 that may be used in a submersible camera system and illustrates components of the camera system internal to the camera body. The components of the integrated loudspeaker system will be discussed in five sections: loudspeaker housing, control components, components external to the loudspeaker membrane (hereafter, external components), components internal to the loudspeaker membrane (hereafter, internal components), and the loudspeaker membrane.

In the embodiments described below, the integrated loudspeaker system is configured to project sound from inside the camera body in an outward direction perpendicular to the bottom facing surface of the camera body (e.g. downwards in the orientation of FIG. 2B); however, those knowledgeable in the art will recognize that the loudspeaker may be placed in any internal location of the camera system and configured to project to any external face of the camera.

Loudspeaker Housing

Components of the integrated loudspeaker system may be coupled to a loudspeaker housing 210. The loudspeaker housing 210 may be configured to encapsulate all components of the integrated loudspeaker system and provide structural integrity of the loudspeaker components throughout system use in action settings and harsh environments.

In the illustrated embodiment, the loudspeaker housing 210 may comprise a set of walls, each wall comprising three sub sections: the housing sidewall 210a, the housing lip 210b, and the housing platform 210c. All components of the housing have a front side facing an internal bottom surface of the camera (e.g. facing downwards in the orientation of FIG. 2B) and a back side facing an internal top surface of the camera (e.g. facing upwards in the orientation of FIG. 2B). The components have a proximal side and a distal side, the proximal side facing the center of the camera and the distal side facing an outer surface of the camera.

The distal side of the housing lip 210b is coupled to the proximal side of the housing wall 210a such that the housing lip 210b extends from the housing wall towards the center of the camera. The housing lip 210b and housing wall 210a are further coupled such that the top side of the wall and lip are substantially flush. The back side of the housing platform 210c is coupled to the top side of the housing wall 210a and top side of the housing lip 210b such that the housing platform 210c does not wholly overlap the housing lip 210b.

In some embodiments a waterproof gasket is coupled between respective interfaces of the housing sidewall 210a, the housing lip 210b, and the housing platform 210c. In other embodiments, the waterproof gasket may be coupled between the housing wall and other components of the camera. In still other embodiments, the loudspeaker housing may also function as a waterproof gasket.

The shape of the housing 210 may substantially conform to the shape of the external perimeters of the loudspeaker components. The loudspeaker housing 210 may couple to the camera body 102 such that the external surfaces of the housing 210 is substantially flush with other surfaces of the camera body 102.

Control Components

The camera system is configured to concurrently capture video and audio from the surrounding environment via the visual and audio systems of the camera. Control of the integrated loudspeaker system may be accomplished using a combination of control mechanisms that can configure the loudspeaker system and allow audio playback in variety of external environments. The components that control the loudspeaker system may include input/output hardware, a loudspeaker printed circuit board, sensors, and similar.

Loudspeaker Printed Circuit Board

The integrated loudspeaker system may be physically and electrically coupled to a loudspeaker printed circuit board (LPCB) 220 that controls the translation of encoded audio signals into electrical signals. The electrical signals are then converted into vibrational sound waves to be projected by the loudspeaker system. The LPCB may be coupled to the loudspeaker via electrical cabling, wireless communication devices, optical communication devices, or any other suitable mediums. The LPCB may include various electronic components for the control of the loudspeaker system including input/output devices, a microprocessor, power electronics, electrical components such as resistors, inductors, etc., and sensor devices used to control the output of LPCB. The LPCB may be electrically coupled to other components of the submersible camera system to control operation of the integrated camera system, including buttons on the body of the camera and the interactive display device, or similar.

The LPCB may be electrically coupled to external devices for control of the loudspeaker system via the input/output electronics of the submersible camera system. The external devices used to control the operation and configuration of the loudspeaker system may include a desktop computer, a personal computing device, a cell phone, a website, a social networking platform, or similar. The input/output mechanisms electrically coupling the LPCB to external devices may include electrical cabling, wireless communication systems, optical communication devices, or similar.

Sensors

The control components may include various sensor mechanisms to monitor the state of the loudspeaker system. The sensors may be coupled to the LPCB, the loudspeaker, or the loudspeaker system such that the sensors are able to sense conditions of the loudspeaker during audio playback in dry and wet environments. The sensor systems may include barometers, thermometers, gyroscopes, global positioning systems, accelerometers, microphones, or similar. The sensors may be configured to sense, measure and monitor any of temperature, pressure, moisture, position, velocity, acceleration, orientation, audio playback quality, membrane integrity, or any other suitable sensors.

External Components

The components of the integrated loudspeaker system are coupled by the loudspeaker housing and are internal to the camera body. External components may include a speaker grille 230, the first loudspeaker adhesive 232 and the loudspeaker membrane cap 234 that collectively form walls around a first loudspeaker cavity 236. The components allow transmission of sound waves from the internal environment of the camera body 102 to the external environment.

Loudspeaker Grille

In the illustrated embodiment of FIG. 2A-2B, the outermost component of the integrated loudspeaker system may be the loudspeaker grille 230. The loudspeaker grille 230 can have a front side, a back side and distal facing sidewalls. The front side may face the same direction as the external bottom facing side of the camera (e.g. facing downwards in the orientation of FIG. 2B) and the back side may face an internal top surface of the camera (e.g. facing up in the orientation of FIG. 2B). The loudspeaker grille 230 may be coupled to the camera body 102 such that the grille conforms to the shape of the camera surface and is substantially flush with the surface of the camera body 102.

The loudspeaker grille may be a grille plate 230a with an array of grille ports 230b from the front side to the back side of the plate with grille extensions 230c coupled to the edges of the grille plate 230a. The grille ports 230b allow the passage of vibrational sound waves from inside the camera body 102 to outside the camera body 102 and vice versa. The array of grille ports 230b may be a series of linear ports oriented such that the linear ports make a non-zero angle relative to the bottom front edge of the camera body. In other embodiments, the array of grille ports 230b may be a series of circular ports, a series of square ports, or any other combination of ports from the front side to the back side that allow the passage of sound waves to the inside of the camera body. In still other embodiments, the grille ports 230b may not be an array and may be a singular port from the front side to the back side. In still other embodiments, the grill ports 230b may be replaced with membranes or substantially thinned areas of the grille plate 230 that allow passage of sound waves through the camera body.

The loudspeaker grille 230 is coupled to the loudspeaker housing 220 via the grille extensions 230c. The grille extensions 230c extend outward from the edges of the grille plate 230a and are configured to couple the loudspeaker grille 230a to loudspeaker housing 220 such that the back side of the grille extensions 230c couple to the top side of the housing platform 210c with a pressure sensitive adhesive (PSA). The PSA may be placed at the interface between the back side of loudspeaker grille extensions 230c and the front side of the housing platform 210c and forms a bond between the two when pressure may be applied to the interface during assembly of the camera system. In other embodiments the adhesive is not pressure sensitive. In other embodiments, the loudspeaker grille 230 may be coupled to the camera housing 220 via a set screw, a latch, a clip, or any other suitable coupling device.

Loudspeaker Membrane Cap

The loudspeaker membrane cap 234 may be a substantially rectangular annulus with an outside perimeter similar to the edge of the loudspeaker membrane 240 and an internal perimeter smaller than the outer perimeter. The membrane cap 234 may have a front side, a back side, distal facing sidewalls, and is configured to provide mechanical support to the loudspeaker membrane 240. The front side may face an internal bottom surface of the camera (e.g. facing downwards in the orientation of FIG. 2B) and the back side may face an internal top surface of the camera (e.g. facing upwards in the orientation of FIG. 2B). The back side of the loudspeaker membrane cap 234 may be coupled to the loudspeaker membrane 240 with the first loudspeaker adhesive 232. The first loudspeaker adhesive 232 may be a PSA and might be placed at the interface between the back side of membrane cap 234 and the front side of the loudspeaker membrane 232 and forms a bond between the two when pressure may be applied to the interface during assembly of the camera system. In other embodiments, the adhesive is not pressure sensitive. The distal facing sidewalls of the loudspeaker membrane cap 234 can be coupled to the loudspeaker housing 210 via an adhesive. In one embodiment, the front side of the loudspeaker membrane cap 234 may be coupled to the back side of the loudspeaker grille 230.

The loudspeaker membrane cap 234 is configured to provide mechanical support to the loudspeaker membrane 240. In some embodiments the loudspeaker membrane cap 234 may be constructed of a material with a greater mechanical stiffness than the loudspeaker membrane 240.

First Loudspeaker Cavity

The first loudspeaker cavity 236 is the area enclosed by the loudspeaker membrane 240, the loudspeaker grille 230, the loudspeaker membrane cap 234, and the loudspeaker housing 210. Herein the first loudspeaker cavity 236 is also referred to as the first linear distance which may be the distance between the loudspeaker membrane 240 and the back side of the loudspeaker grille 230. The first loudspeaker cavity 236 can be of a threshold depth such that bowing of the loudspeaker grille 230 induced by pressure on the camera body 102 and loudspeaker grille 230 by the external environment does not allow for contact between the loudspeaker grille 230 and loudspeaker membrane 240. Additionally, the first loudspeaker cavity 236 might be configured to allow for the outward bowing of the loudspeaker membrane 240 induced during audio playback without contacting the loudspeaker grille 230. The size of the housing platform 210a may be configured such that the size of the first loudspeaker cavity can be different sizes. In the illustrated embodiment, the first loudspeaker cavity 236 is approximately 6.0 mm. In other embodiments, the first loudspeaker cavity may be between 4.0 mm and 8.0 mm.

Loudspeaker Membrane

The internal and external components of the loudspeaker system are separated by the loudspeaker membrane 240. The loudspeaker membrane 240 is configured to allow transmission of acoustic waves from the internal components to the external components.

The loudspeaker membrane 240 may be a substantially rectangular film with an outside perimeter similar to the loudspeaker housing 210 and is configured to protect the loudspeaker 250 from dust, water, and other adverse external environments. The loudspeaker membrane 240 may have a front side and a back side. The front side of the loudspeaker membrane 240 may face an internal bottom surface of the camera (e.g. facing downwards in the orientation of FIG. 2B) and the back side may face an internal top surface of the camera (e.g. facing upwards in the orientation of FIG. 2B). The front side of the loudspeaker membrane 240 may be coupled to the loudspeaker membrane cap 234 and the back side of the loudspeaker membrane may be coupled to the front side of the housing lip 210b by the second loudspeaker adhesive 254. The second loudspeaker adhesive may be a PSA placed at the interface between the back side of membrane cap 234 and the front side of the housing lip 210b and forms a bond between the two when pressure may be applied to the interface during assembly of the camera system. In other embodiments, the adhesive is not pressure sensitive.

The loudspeaker membrane 240 may be configured to vibrate during the playback of audio signals such that the acoustic vibrations of the loudspeaker 250 are translated through the membrane and external to the camera body through the loudspeaker grille 230 as sound waves. The loudspeaker membrane 240 may vibrate in both submerged and unsubmerged environments such that audio playback in both environments is possible. The loudspeaker membrane 240 may be further configured to deform without breaking when the pressure differential between the external and internal components of the integrated loudspeaker system is high, e.g. in a submerged environment.

The loudspeaker membrane 240 may be constructed of a material that is impermeable to air, water, and particulate matter. In some embodiments the loudspeaker membrane 240 may be constructed from plastic, rubber, foils, or similar. In an embodiment, the membrane is silicone and is 0.1 mm in thickness. In other embodiments, the third loudspeaker cavity may be between 0.025 mm and 0.5 mm.

Internal Components

The internal components of the loudspeaker system are sensitive to the external environment and are protected by the loudspeaker membrane 240. Components internal to the camera body may include the loudspeaker 250, the loudspeaker support structure 252, the second loudspeaker adhesive 254, the third loudspeaker adhesive 256, the fourth loudspeaker adhesive 258, and the loudspeaker compressible spacer 260. The components allow generation and transmission of sound waves from internal the camera body to the external the loudspeaker membrane.

Loudspeaker Support Structure

The loudspeaker support structure 252 may be a substantially rectangular plate with an outer perimeter similar to the loudspeaker membrane and configured to protect the loudspeaker from the vibrating loudspeaker membrane and prevent the loudspeaker membrane from vibrating or bowing inwards to a point of failure. The support structure may have a front side, a back side, and distal facing sidewalls.

The loudspeaker support structure 252 may be a substantially rectangular support plate 252a with an array of support structure ports 252b from the front side to the back side of the support structure plate with support extensions 252c coupled to the edges. The support structure ports 252b allow the passage of sound waves from internal the camera body to external the camera body. The array of support structure ports 252b may be a series of substantially rectangular ports. The support structure plate 252a is a material with a high mechanical stiffness. In an embodiment, the support structure plate is sheet metal and is 0.2 mm in thickness. In other embodiments, the support structure plate may be between 0.1 mm and 0.4 mm.

In another embodiment the support structure ports 252c are linear and oriented such that the linear ports make a non-zero angle relative to the bottom front edge of the camera body. In other embodiments, the array of support structure ports 252c may be a series of circular ports, a series of square ports, or any other combination of ports from the front side to the back side that allow the passage of sound waves into and out of the camera body. In still other embodiments, the support structure ports 252c may not be an array and may be a singular port from the front side to the back side. In still other embodiments, the support structure ports may be replaced with membranes or substantially thinned areas of the support structure that allow passage of sound waves through the camera body.

The front side of the loudspeaker support structure 252 may face an internal bottom surface of the camera (e.g. facing downwards in the orientation of FIG. 2B) and the back side may face an internal top surface of the camera (e.g. facing upwards in the orientation of FIG. 2B). The front side of the support structure extensions 252c may be coupled to the back side of the housing lip 210b with the third loudspeaker adhesive 256. The third loudspeaker adhesive 256 may be a PSA and may be placed at the interface between the front side of the support structure extensions 252c and the back side of the housing lip 210b and can form a bond between the two when pressure may be applied to the interface during assembly of the camera system. In other embodiments, the adhesive is not pressure sensitive. The back side of the support structure extensions may be coupled to the loudspeaker with a fourth loudspeaker adhesive 258. The fourth loudspeaker adhesive 258 may be a PSA and may be placed at the interface between the back side of the support structure extensions 252c and the front side of the loudspeaker 250 and can form a bond between the two when pressure may be applied to the interface during assembly of the camera system. In other embodiments, the adhesive is not pressure sensitive.

Second Loudspeaker Cavity

The second loudspeaker cavity 260 is the area enclosed by the loudspeaker membrane 240, the loudspeaker support structure 252, and the loudspeaker housing 210. Herein the second loudspeaker cavity 260 is also referred to as the second linear distance between the membrane 240 and the front side of the loudspeaker support structure 252. The second loudspeaker cavity 260 can be configured such that deformation of the loudspeaker membrane 240 induced by pressure on the camera body 102 and camera membrane 240 does not allow for contact between the loudspeaker membrane 240 and loudspeaker support structure 252. Additionally, the second loudspeaker cavity 260 can be configured to allow for outward bowing and vibrations of the loudspeaker membrane during audio playback without contacting the loudspeaker grille 230. In an embodiment, the second loudspeaker cavity is approximately 6.0 mm. In other embodiments, the second loudspeaker cavity may be between 4.0 mm and 8.0 mm.

Loudspeaker

The loudspeaker 250 is a system that translates encoded audio signals from the LPCB into sound waves to be projected external to the camera body 102. The loudspeaker 250 may comprise magnetic coils 250a capable of conducting electric current. As the current flows through the coils, the coils become a temporary electromagnet. The electromagnet may be attracted and repelled by magnets 250b within the loudspeaker to oscillate the loudspeaker diaphragm 250c back in forth to create acoustic sound waves. The loudspeaker 250 is configured such that the sound waves are projected towards an external surface of the camera body 102.

In the illustrated embodiment, the loudspeaker 250 has a front side, a back side, and distal facing sidewalls. The front side of the loudspeaker 250 may face an internal bottom surface of the camera (e.g. facing downwards in the orientation of FIG. 2B) and the back side may face an internal top surface of the camera (e.g. facing upwards in the orientation of FIG. 2B). The distal facing sidewalls, the top side, and the back side enclose the loudspeaker hollow 250d, an area configured to improve audio performance during playback. The front side of the loudspeaker 250 may be coupled to the loudspeaker support structure 210 and the back side may be coupled to the loudspeaker compressible spacer. In some embodiments, the distal facing sidewalls may be coupled to the loudspeaker housing sidewalls. In still other embodiments the top of the loudspeaker may be coupled to the back side of the housing lip.

Third Loudspeaker Cavity

The third loudspeaker cavity 262 is the area enclosed by the loudspeaker support structure 252, the loudspeaker 250, and the loudspeaker housing 210. Herein the third loudspeaker cavity 262 is also referred to as the third linear distance, the third linear distance the distance between the front side of the loudspeaker 250 and the back side of the loudspeaker support structure 252. The third loudspeaker cavity 262 can be configured to allow for the outward bowing and vibrations of the loudspeaker diaphragm 250c during audio playback to not contact the loudspeaker support structure 252. In the illustrated embodiment, the third loudspeaker cavity 262 is approximately 6.0 mm. In other embodiments, the third loudspeaker cavity may be between 4.0 mm and 8.0 mm.

Compressible Spacer

The compressible spacer 270 may have a front side and a back side, the front side facing an internal bottom surface of the camera body, and the back side facing an internal top surface of the camera body. The front side of the compressible spacer may 270 be coupled to the back side of the loudspeaker 250 by a spacer adhesive. The spacer adhesive may be a PSA, and the PSA may be placed at the interface between the back side of the loudspeaker and the front side of the compressible spacer 270 and forms a bond between the two when pressure may be applied to the interface during assembly of the camera system. The surface area of the front side of the compressible spacer 270 might be less than the surface area of the back side of the loudspeaker 250 such that the entirety of the front side of the compressible spacer 270 may be within the edges of the back side of the loudspeaker 250 when bonded together by the PSA.

The back side of the compressible spacer 270 can be coupled to auxiliary components of the camera system internal to the camera body. The compressible spacer 270 might be constructed of a material with a mechanical stiffness that allows deformation of the compressible spacer 270. The deformation of the compressible spacer 270 may originate from a compressive force between auxiliary components internal to the camera body coupled to the back side of the compressible spacer and the loudspeaker coupled to the front side of the compressible spacer 270. Before assembly, the compressible spacer 270 may have an original distance between the front side and the back side. During assembly, the compressive force can cause the compressible spacer 270 to reduce in volume; i.e., the distance between the front side and the back side can reduce as a result of the compressive force. In some embodiments, the compressive force may originate from the camera being submerged in liquid. In still other embodiments, the compressive force compressing the compressible spacer may act to reduce the pressure differential on opposing sides of the membrane.

Submersed Conditions

Figure 3:
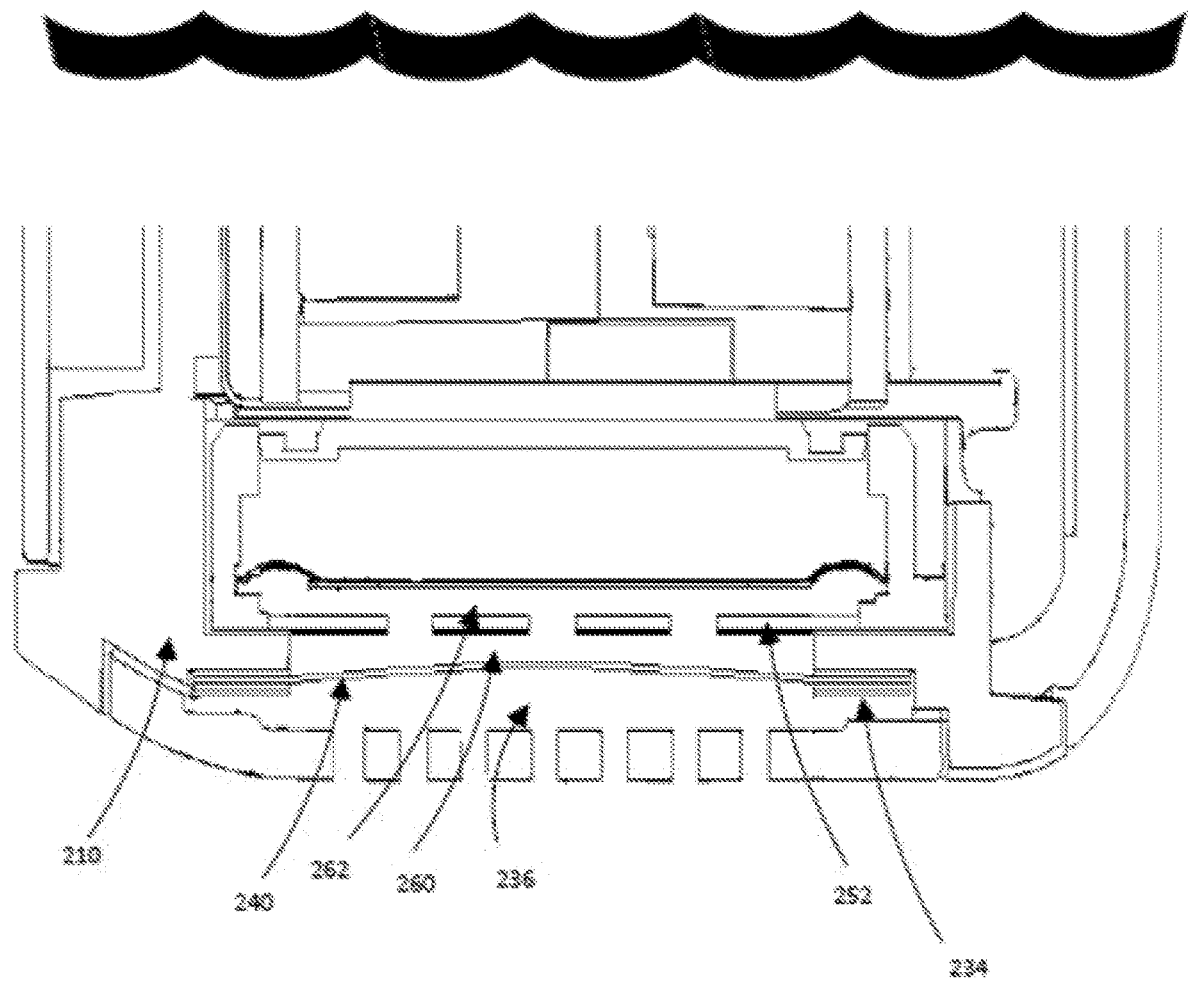
FIG. 3 is a third cross-sectional view of a speaker system in a submersible camera system when submersed, according to one embodiment.

FIG. 3 illustrates the submersible camera system submerged in a wet environment. In the illustrated embodiment the loudspeaker membrane 240 can bow towards the center of the camera due to the water pressure on the external to the camera body 102 and loudspeaker membrane 240. The camera may be configured such that as the pressure increases, the first loudspeaker cavity 236 increases in volume, the second loudspeaker cavity decreases 260 in volume, and the third loudspeaker cavity 262 remains the same volume. In other words, the first linear distance increases relative to the out of water state, the second linear distance decreases relative to the out of water state, and the third linear distance remains approximately constant. The membrane cap 234, the support structure 252, and the housing 210 can provide mechanical support to the membrane 240 so that the bowing when submerged underwater does not compromise the mechanical integrity of the membrane 240 when being deformed. The compressible spacer may compress from the pressure on the outside of the loudspeaker membrane 240.

The loudspeaker 250 may be configured to vibrate the loudspeaker diaphragm 250c such that the loudspeaker 250 creates sound waves. The sound waves can vibrate the loudspeaker membrane 240 and project sound waves external the camera body 102 while submerged underwater. When the camera is removed from wet environment, the water drains from the camera system and the first cavity 236, the second cavity 260, and the third cavity 262 return to their normal positions. The loudspeaker system may be additionally configured for generation of sound waves to project external to the camera body in a dry environment.

Example System Configuration

Figure 4:
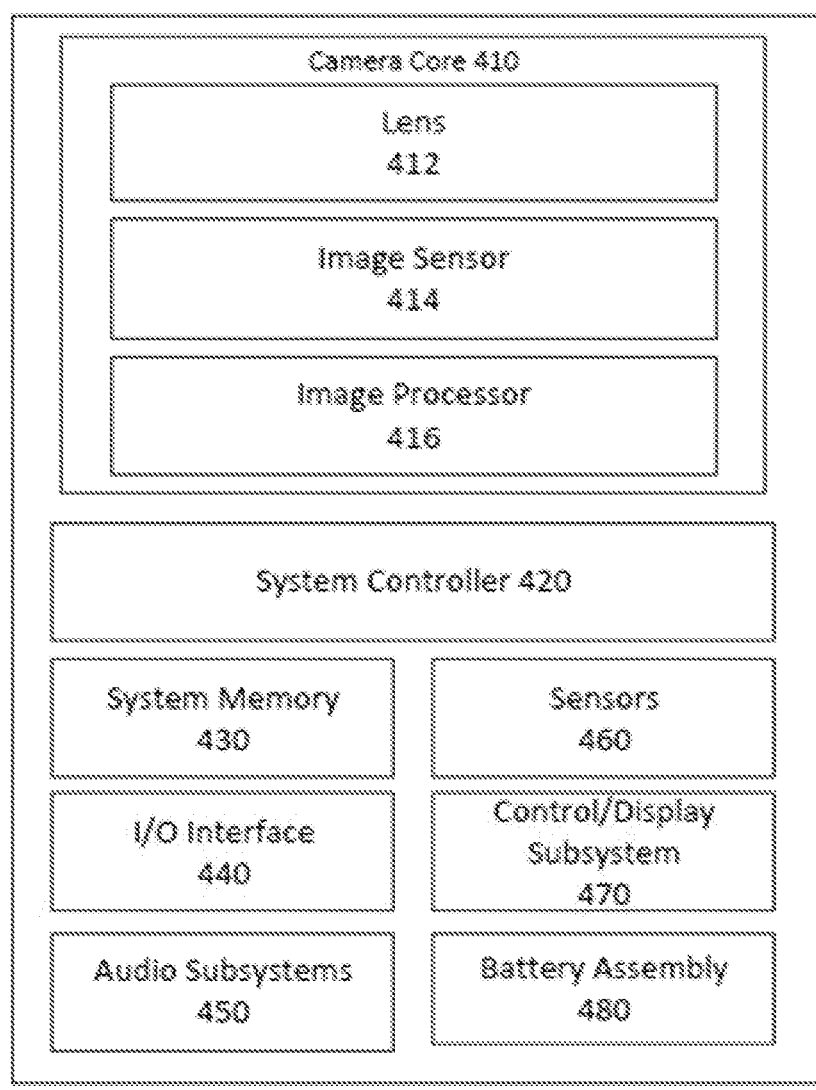
FIG. 4 is an illustration of an example camera architecture, according to one embodiment.

FIG. 4 is a block diagram illustrating a system level example camera architecture 400 corresponding to the camera demonstrated in FIGS. 1A-1D. The camera architecture 200 may include a thermal management system for a camera battery. The thermal management system may be configured for operation in low ambient temperature environments. The camera architecture 400 may include a camera core 410, a system controller 420, a system memory 430, an I/O interface 440, an audio subsystem 450, sensors 260, a control/display subsystem 470, and a battery assembly 480. The camera core may include a lens 412, an image sensor 414, and an image processor 414.

The components in FIG. 4 are grouped functionally and do not necessarily reflect a physical architecture of the camera architecture 400. For example, as described above, in one embodiment, the control/display subsystem 470 is embodied in a separate physical integrated circuit chip from the image processor 416. The integrated circuit chip including the image processor 416 also may include, for example, the image sensor 412, the system controller 420, system memory 430 and portions of the audio sub-system 450, I/O interface 440, and control/display sub-system 470.

In the example embodiment illustrated in FIG. 4, the camera architecture 400 has a camera core 410 that may include a lens 412, an image sensor 414, and an image processor 416. The camera architecture 400 additionally may include a system controller 420 (e.g., a microcontroller or microprocessor) that controls the operation and functionality of the camera architecture 400. The camera architecture 400 may include system memory 430 configured to store executable computer instructions that, when executed by the system controller 420 and/or the image processors 416, perform the camera functionalities described hereafter. In some example embodiments, a camera architecture 400 may include multiple camera cores 410 to capture fields of view in different directions which may then be stitched together to form a cohesive image. For example, in an embodiment of a spherical camera system, the camera architecture 200 may include two camera cores 410 each having a hemispherical or hyper hemispherical lens that each capture a hemispherical or hyper-hemispherical field of view which are stitched together in post-processing to form a spherical image. In other embodiments, multiple camera cores 410 may operate in separate cameras and be integrated via the I/O interface 440. For example, in an embodiment of a camera array system, the camera architecture may include at least two camera cores on at least two different cameras connected via the I/O interface 440 whose images are stitched together in post-processing to create a larger camera image.

The lens 412 can be, for example, a wide angle lens, hemispherical, or hyper hemispherical lens that focuses light entering the lens to the image sensor 414 which captures images and/or video frames. The image sensor 414 may capture high-definition video having a resolution of, for example, 480p, 720p, 1080p, 4 k, or higher, or any other video resolution. For video, the image sensor 414 may capture video at frame rates of, for example, 30 frames per second, 60 frames per second, or higher, or any other possible frame rates. The image processor 416 performs one or more image processing functions of the captured images or video. For example, the image processor 416 may perform a Bayer transformation, de-mosaicing, noise reduction, image sharpening, image stabilization, rolling shutter artifact reduction, color space conversion, compression, or other in-camera processing functions. The image processor 416 may furthermore perform the timing metric calculations. The timing metric calculations may include determining frame rates, shutter speeds, exposure times, battery lifetimes, rate of change of battery lifetimes, time stamping of image, or similar. Processed images and video may be temporarily or persistently stored to system memory 430 and/or to a non-volatile storage, which may be in the form of internal storage or an external memory card. Additionally, the image processor may be configured to capture video or images and not store them in the system memory 430.

An input/output (I/O) interface 440 may transmit and receive data from various external devices. For example, the I/O interface 440 may facilitate the receiving or transmitting video or audio information through an I/O port. Examples of I/O ports or interfaces include USB ports, HDMI ports, Ethernet ports, audio ports, and the like. Furthermore, embodiments of the I/O interface 440 may include wireless ports that can accommodate wireless connections. Examples of wireless ports include Bluetooth, Wireless USB, Near Field Communication (NFC), and the like. The I/O interface 440 may also include an interface to synchronize the camera architecture 400 with other cameras or with other external devices, such as a remote control, a second camera, a smartphone, a client device, or a video server.

The audio subsystem 450 includes, for example, one or more microphones, one or more loudspeakers, one or more audio processors to capture and process audio data correlated with video capture, and one or more audio processors to play and process audio data correlated with video capture. In one embodiment, the audio subsystem 450 includes a microphone array having two or more microphones arranged to obtain directional audio signals. In another embodiment, the audio subsystem includes loudspeaker systems described in FIGS. 2A-2B. The audio subsystem may be configured to playback or record audio signals when the loudspeaker and microphone systems are at least partially submerged in water or in a dry environment. The audio subsystem 450 may interact with the sensors 460 to detect the amount of moisture in the camera system and adjust the audio playback to compensate for adverse effects created by moisture in the audio subsystems.

Sensors 460 may capture various metadata concurrently with, or separately from, video capture. For example, the sensors 460 may capture time-stamped location information based on a global positioning system (GPS) sensor, and/or an altimeter. Other sensors 460 may be used to detect and capture orientation of the camera architecture 400 including, for example, an orientation sensor, an accelerometer, a gyroscope, or a magnetometer. Additional sensors may be used to detect and capture information about the camera system such as internal or external temperature of camera components such as the camera core, the system controller or the battery assembly. The sensors 460 may additionally detect the presence of liquids within or external to the camera body or the proximity of liquids to camera components. The sensors may also be configured to monitor the integrity of camera components such as microphones, speakers, membranes, lenses, or any other component of the camera coupled to a sensor. The sensors may also comprise components capable of monitoring position, pressure, time, velocity, acceleration or similar.

Sensor data captured from the various sensors 460 may be processed to generate other types of metadata. For example, sensor data from the accelerometer may be used to generate motion metadata, comprising velocity and/or acceleration vectors representative of motion of the camera architecture 400. Sensor data from a GPS sensor can provide GPS coordinates identifying the location of the camera architecture 400, and the altimeter can measure the altitude of the camera architecture 400. In one embodiment, the sensors 460 are rigidly coupled to the camera architecture 400 such that any motion, orientation or change in location experienced by the camera architecture 400 is also experienced by the sensors 460. The sensors 460 furthermore may associate a time stamp representing when the data was captured by each sensor. In one embodiment, the sensors 460 automatically begin collecting sensor metadata when the camera architecture 400 begins recording a video. In still other embodiments the sensors may be external to the camera body and transmit the sensor data or sensor metadata to the camera via the I/O interface 440. In one embodiment, the sensors may be configured to sense the amount of moisture within the first loudspeaker cavity 236, the second loudspeaker cavity 260, the third loudspeaker cavity 262 or the loudspeaker membrane 240. In still another embodiment, the sensors may be configured to detect the amount of pressure on the loudspeaker membrane 240 or the amount of deformation of the loudspeaker membrane 240. Further, the sensors 460 may be configured to detect abnormalities in the vibrations of the loudspeaker membrane 240 during audio playback when the loudspeaker membrane is at least partially wet 240 and the vibrations of the membrane are dampened.

A control/display subsystem 470 includes various control and display components associated with operation of the camera architecture 400 including, for example, LED lights, a display, buttons, microphones, speakers, and the like.

The battery assembly 480 may include power cells for powering various components of the camera system. For example the power cells may be a Lithium-Ion battery, a Nickel-Cadmium battery, a Nickel-metal-Hydride battery, a Lithium-Polymer battery, a Lead-Acid battery, a solar-cell, a power cord to an external power source, a kinetic power generation system, or any other component used to power an electrical system. The battery assembly may be configured to be controlled by the system controller 420, with the system controller dictating which components of the camera sub-systems and components will receive power during operation. The battery assembly 480 may be controlled by various input mechanisms (such as buttons, switches, and touch-screen mechanisms) on the external body of the camera or by directions received via the I/O interface 460. Additionally, the battery assembly 480 may be removable from the camera system to allow for recharging the power cells of the battery assembly or replacing the current battery assembly 480 with a different battery assembly 480.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a heat spreader as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera comprising:
a camera body comprising a loudspeaker grille;
a loudspeaker housing comprising a wall fixedly attached to an internal portion of the camera body, wherein a portion of the wall protrudes into an internal area of the loudspeaker housing to form a lip portion, wherein the lip portion comprises a first surface that is facing externally away from the loudspeaker housing and a second surface that is facing internally towards the loudspeaker housing;
a loudspeaker assembly fixedly attached to the loudspeaker housing, the loudspeaker assembly comprising:
a loudspeaker; and
an audio circuit board fixedly attached to the loudspeaker;
a waterproof membrane attached to the first surface of the lip portion of the loudspeaker housing and separating the loudspeaker assembly from the loudspeaker grille;
a support structure attached to the second surface of the lip portion of the loudspeaker housing and separating the waterproof membrane from the loudspeaker assembly, the support structure configured to limit an amount of deformation of the waterproof membrane, the support structure fixedly attached to the loudspeaker assembly and the second surface of the lip portion of the loudspeaker housing and comprising an array of support structure ports configured to allow passage of sound waves from the loudspeaker to the waterproof membrane;
the loudspeaker housing configured to mechanically support the loudspeaker assembly, the loudspeaker grille, the waterproof membrane and the support structure such that
a first loudspeaker cavity exists between a first side of the loudspeaker grille and a first side of the waterproof membrane,
a second loudspeaker cavity exists between a second side of the waterproof membrane and a first side of the support structure, and
a third loudspeaker cavity exists between a second side of the support structure and a first side of the loudspeaker assembly.

2. The camera of claim 1, wherein the first loudspeaker cavity has a distance from the first side of the loudspeaker grille to the first side of the waterproof membrane of between 4.0 mm and 8.0 mm when the waterproof membrane is non-deformed.

3. The camera of claim 1, wherein the second loudspeaker cavity has a distance from the second side of the waterproof membrane to the first side of the loudspeaker of between 4.0 mm and 8.0 mm when the waterproof membrane is non-deformed.

4. The camera of claim 1, further comprising a compressible spacer coupled to the loudspeaker assembly, wherein the compressible spacer is coupled to an auxiliary camera component by a compressive force created between the loudspeaker assembly and the auxiliary camera component.

5. The camera of claim 1, wherein the loudspeaker and waterproof membrane are configured such that the waterproof membrane translates sound waves from the loudspeaker assembly when the camera system is submerged in water and the waterproof membrane is deformed.

6. The camera of claim 1, wherein the loudspeaker and waterproof membrane are configured such that the waterproof membrane translates sound waves from the loudspeaker assembly when the camera system is at least partially wet and the waterproof membrane is deformed.

7. A camera comprising:
a camera body comprising a loudspeaker grille;
a loudspeaker housing comprising a wall fixedly attached to an internal portion of the camera body, wherein a portion of the wall protrudes into an internal area of the loudspeaker housing to form a lip portion, wherein the lip portion comprises a first surface that is facing externally away from the loudspeaker housing and a second surface that is facing internally towards the loudspeaker housing;
a loudspeaker assembly fixedly attached to the loudspeaker housing;
a waterproof membrane attached to the first surface of the lip portion of the loudspeaker housing and separating the loudspeaker assembly from the loudspeaker grille;
a support structure attached to the second surface of the lip portion of the loudspeaker housing and separating the waterproof membrane from the loudspeaker assembly, the support structure configured to limit an amount of deformation of the waterproof membrane, the support structure fixedly attached to the loudspeaker assembly and the second surface of the lip portion of the loudspeaker housing and comprising an array of support structure ports configured to allow passage of sound waves from the loudspeaker to the waterproof membrane; and
the loudspeaker housing configured to mechanically support the loudspeaker assembly, the loudspeaker grille, the waterproof membrane and the support structure.

8. The camera system of claim 7, wherein the loudspeaker housing further comprises:
a first loudspeaker cavity between a first side of the loudspeaker grille and a first side of the waterproof membrane.

9. The camera of claim 8, wherein the loudspeaker housing further comprises:
a second loudspeaker cavity between a second side of the waterproof membrane and a first side of the support structure.

10. The camera of claim 9, wherein the loudspeaker housing further comprises:
a third loudspeaker cavity exists between a second side of the support structure and a first side of the loudspeaker assembly.

11. The camera of claim 8, wherein the first loudspeaker cavity has a distance from the first side of the loudspeaker grille to the first side of the waterproof membrane of between 4.0 mm and 8.0 mm when the waterproof membrane is non-deformed.

12. The camera of claim 9, wherein the second loudspeaker cavity has a distance from the second side of the waterproof membrane to the first side of the loudspeaker of between 4.0 mm and 8.0 mm when the waterproof membrane is non-deformed.

13. The camera of claim 7, further comprising a compressible spacer coupled to the loudspeaker assembly, wherein the compressible spacer is coupled to an auxiliary camera component by a compressive force created between the loudspeaker assembly and the auxiliary camera component.

14. The camera of claim 7, wherein the loudspeaker and waterproof membrane are configured such that the waterproof membrane translates sound waves from the loudspeaker assembly when the camera system is submerged in water and the waterproof membrane is deformed.

15. The camera of claim 7, wherein the loudspeaker and waterproof membrane are configured such that the waterproof membrane translates sound waves from the loudspeaker assembly when the camera system is at least partially wet and the waterproof membrane is deformed.

* * * * *